(12) United States Patent
Lee et al.

(10) Patent No.: US 8,542,200 B2
(45) Date of Patent: Sep. 24, 2013

(54) TOUCH SENSING ELECTROPHORETIC DISPLAY DEVICE

(75) Inventors: Sang-Myoung Lee, Hwaseong-si (KR);
Tae-Hyun Hwang, Seoul (KR);
Hyung-Il Jeon, Incheon-si (KR)

(73) Assignee: Samsung Display Co., Ltd. (KR)

( * ) Notice: Subject to any disclaimer, the term of this patent is extended or adjusted under 35 U.S.C. 154(b) by 632 days.

(21) Appl. No.: 12/642,410

(22) Filed: Dec. 18, 2009

(65) Prior Publication Data

US 2011/0050642 A1 Mar. 3, 2011

(30) Foreign Application Priority Data

Aug. 26, 2009 (KR) ........................ 10-2009-0079471

(51) Int. Cl.
*G06F 3/042* (2006.01)

(52) U.S. Cl.
USPC ............................ 345/173; 345/107; 345/174

(58) Field of Classification Search
None
See application file for complete search history.

(56) References Cited

U.S. PATENT DOCUMENTS

| | | | | |
|---|---|---|---|---|
| 5,286,976 A * | 2/1994 | Cole | ........................... | 250/349 |
| 7,477,445 B2 * | 1/2009 | Lee | ........................... | 359/296 |
| 2006/0019374 A1 * | 1/2006 | Uematsu et al. | ........................... | 435/287.9 |
| 2007/0018969 A1 * | 1/2007 | Chen et al. | ........................... | 345/173 |
| 2008/0057632 A1 * | 3/2008 | Arai et al. | ........................... | 438/149 |
| 2008/0158143 A1 * | 7/2008 | Kim et al. | ........................... | 345/107 |
| 2008/0266273 A1 | 10/2008 | Slobodin et al. | | |
| 2010/0090975 A1 * | 4/2010 | Nagata et al. | ........................... | 345/174 |

FOREIGN PATENT DOCUMENTS

| | | |
|---|---|---|
| JP | 2007041169 A | 2/2007 |
| KR | 102007069783 A | 7/2007 |
| KR | 102008039147 A | 5/2008 |
| KR | 102008046960 A | 5/2008 |
| KR | 2009059047 A | 6/2009 |
| KR | 102009058415 A | 6/2009 |
| KR | 102009059875 A | 6/2009 |
| KR | 102009061470 A | 6/2009 |

* cited by examiner

*Primary Examiner* — Van Chow
(74) *Attorney, Agent, or Firm* — Innovation Counsel LLP

(57) ABSTRACT

An image display device has touch sensing sensor components integrally distributed amongst pixel components of the device. In one embodiment, the distribution is one sensor component per one pixel component. In one embodiment, the pixel component forms a pixel portion of an image by selectively reflecting light and the sensor component is composed of a material that reflects light. More specifically, in one embodiment the light reflecting pixel component is an electrophoretic unit and the sensor component includes a layer of titanium having a color filter layer disposed below it and thus protectively covering it. Reflection of light from the light reflecting sensor layer is reduced by providing an anti-reflection layer above it. The sensor component changes resistance in response to change of local temperature or of an amount of infrared radiation impinging on it. Its resistance is measured by way of two wires connected thereto and extending through contact holes provided in the color filter layer.

20 Claims, 5 Drawing Sheets

TOUCH SENSING ELECTROPHORETIC DISPLAY DEVICE

CROSS-REFERENCE TO RELATED APPLICATION

This application claims priority to and the benefit of Korean Patent Application No. 10-2009-0079471 filed in the Korean Intellectual Property Office on Aug. 26, 2009, the entire contents of which application are incorporated herein by reference.

BACKGROUND (a) Field of Disclosure

The present disclosure of invention relates to a touch sensible electrophoretic display.

(b) Description of Related Technology

Recently, products in which a touch sensing device is integrated with a display device have been developed. Such a sensing device may detect a pressure or a change of light generated by a touch such as by a user's finger or a touch pen so that electrical signals according to the touch can be provided to the display device or a data processing unit integrated within the display device. The display device can detect whether or not a touch has occurred and/or what the touch location is on the basis of the electric signals produced by the sensing device, the touch related information can be transmitted to an internal or external data processing device, and the internal/external device can then formulate an new image signal to be displayed based on the contact information it received.

Electrophoretic display devices generally use reflected light to display their images. However, such the display quality may be deteriorated due to the addition of touch panel components that may operate to reduce the amount of reflected light. Also, the electrophoretic display is often formed on a flexible substrate, and the substrate may become bent (deformed) from repeated touches such that the correctness of further touch recognitions is reduced. Also, when the substrate is bent, color separation between neighboring pixels may not be correct such that the display quality is deteriorated.

The above information disclosed in this Background section is only for enhancement of understanding of the background technology of the present disclosure and therefore the background may contain information that does not form part of the prior art that is already known to persons of ordinary skill in the pertinent art.

SUMMARY

The present disclosure provides a touch sensitive display device that can correctly sense a touch without deterioration of display quality even if the display device is bent, and can correctly display responsive images.

An electrophoretic display according to an exemplary embodiment includes: a first light-passing substrate; a sensing layer formed under the first substrate; a sensing line electrically connected to the sensing layer; a second substrate; and an electrophoretic layer disposed between the first substrate and the second substrate.

The sensing layer may be made of a material whose electrical resistance changes when exposed to changed levels of applied infrared (IR) rays or heat. The sensing layer may for example include at least one of vanadium oxide, titanium, platinum, silicon germanium (SiGe), and amorphous silicon.

The sensing layer may be made of a double layer including titanium and titanium oxide.

The sensing layer may include a reflection reducing layer disposed above the sensing layer.

The reflection reducing layer may include a metal oxide or nitride.

A thin film transistor positioned under the sensing layer, a gate line and a data line connected to the thin film transistor and formed under the sensing layer may be further included.

The sensing lines may include a first sensing line extending parallel to the gate line and a second sensing line extending parallel to the data line.

A passivation layer covering the thin film transistor and a pixel electrode formed under the passivation layer may be further included, wherein the passivation layer may have a contact hole defined there through and wherein the pixel electrode is electrically connected to an output terminal of the thin film transistor by way of the contact hole in the passivation layer.

A color filter encapsulating at least a lower part of the sensing layer and formed under the sensing layer may be further included.

The color filter may have at least one contact hole defined there-through and exposing the sensing layer.

At least one of the sensing lines may be electrically connected to the sensing layer by way of a corresponding at least one of the contact holes defined through the color filter.

The plural sensing lines may include a first sensing line and a second sensing line, the at least one contact hole of the color filter may include a first contact hole and a second contact hole, the first sensing line may be electrically connected to the sensing layer through the first contact hole, and the second sensing line may be electrically connected to the sensing layer through the second contact hole.

The electrophoretic layer may include microcapsules including electrophoretic particles.

The electrophoretic particles may be divided into two types of electrophoretic particles having respective charges of opposed polarities.

One of two types of electrophoretic particles may include a dark color imparting material such as carbon black, and the other may include a light color imparting material such as titanium oxide or silica.

A common electrode formed on the second substrate may be further included.

An electrophoretic display according to an exemplary embodiment of the present invention includes: a substrate; a plurality of pixel components formed on the substrate and each including a thin film transistor and a plurality of electrophoretic particles; and a plurality of sensor components formed on the substrate, wherein one or more of the sensor components functions as a light blocking member that blocks external light from becoming incident upon an underlying one or more thin film transistors.

The substrate may further include color filters, and the color filters may cover the sensor components.

Each sensor may be positioned in a region where a corresponding pixel component is formed.

As described above, contact sensing is realized without deterioration of display quality, and even if the display device is bent, correct contact sensing is realized and an image may be correctly displayed.

DETAILED DESCRIPTION

Figure 1:
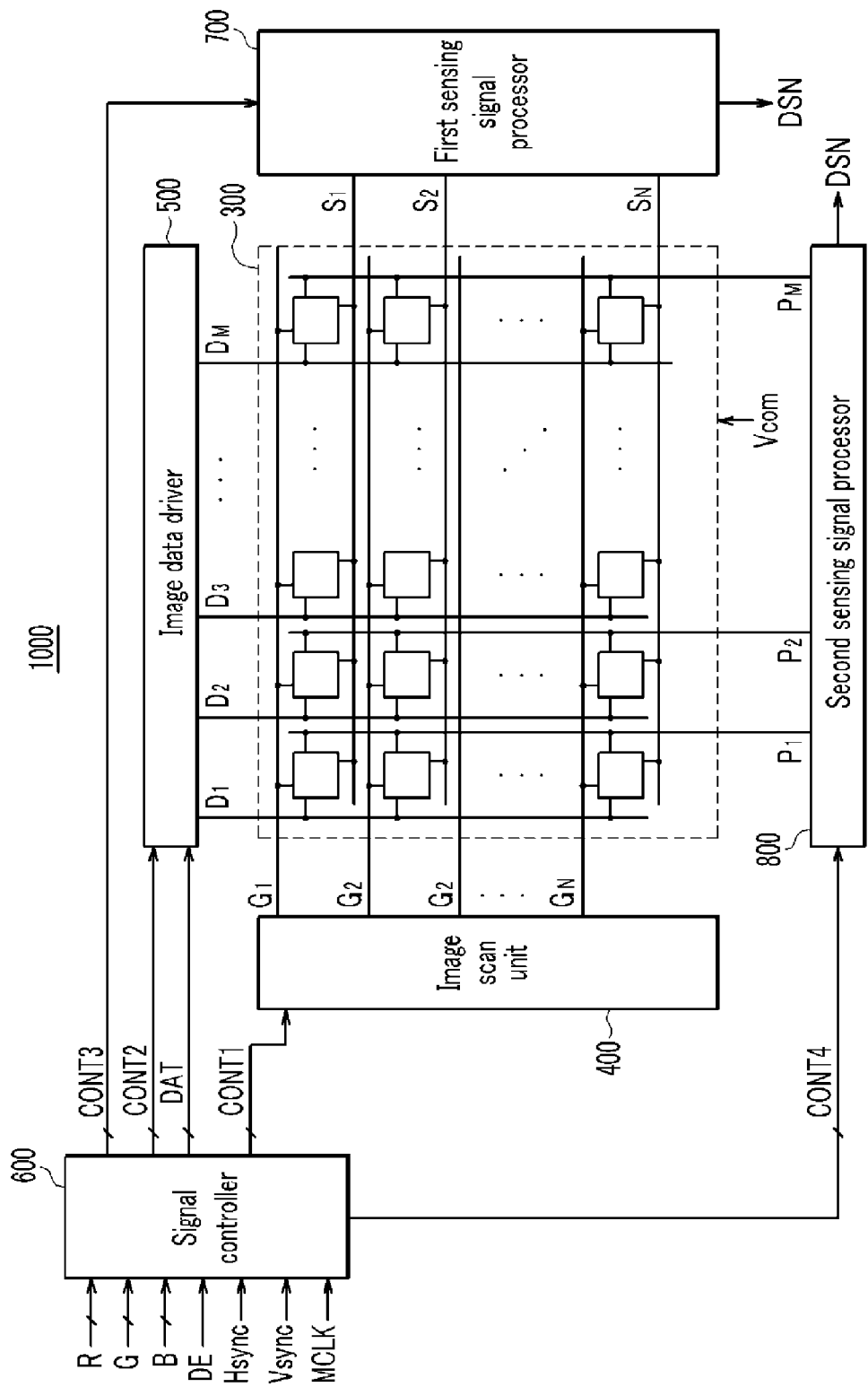
FIG. 1 is a block diagram of a display device according to an exemplary embodiment.

The present disclosure of invention will be described more fully hereinafter with reference to the accompanying drawings, in which one or more exemplary embodiments are shown. As those skilled in the pertinent art would realize after reading this disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a display device according to an exemplary embodiment will be described with reference to FIG. 1 and FIG. 2.

Figure 2:
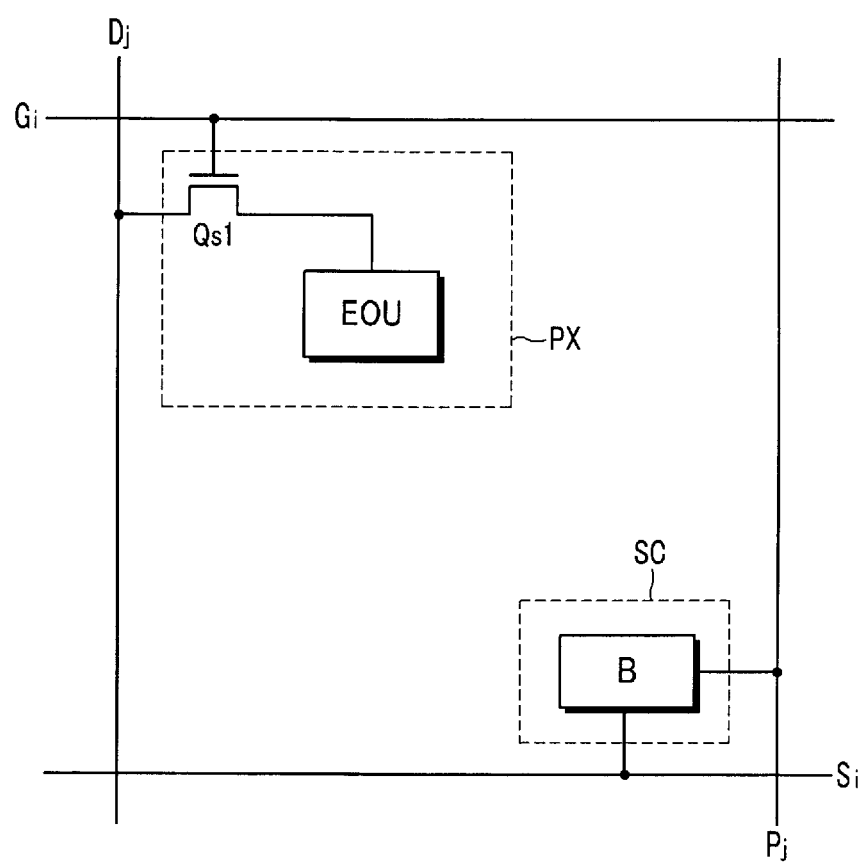
FIG. 2 is an equivalent circuit diagram of a pixel and sensor in a display device according to an exemplary embodiment.

FIG. 1 is a block diagram of an integrated display and touch sensitive device according to the exemplary embodiment and FIG. 2 is an equivalent circuit diagram of a repeated pixel unit having both an image pixel displaying component and a touch sensitive sensing component provided therein.

Referring to FIG. 1, a touch sensitive display device 1000 according to an exemplary embodiment includes a display panel unit 300, an image row scanning unit 400, an image data-lines driving unit 500, sensing signal processors 700 and 800, and a signal controller 600. Although not shown, the signal controller 600 and the sensing signal processors 700 and 800 may be operatively coupled to further data processing circuitry (e.g., a CPU) that is internal to or external of the touch sensitive display device 1000.

Referring to both of FIG. 1 and FIG. 2, the display panel unit 300 may include a support substrate on which there are integrally formed, a plurality of display driving lines $G_1$-$G_N$ and $D_1$-$D_M$, a plurality of image forming pixel components PX connected to the display driving lines, a plurality of sensing signal lines $S_1$-$S_N$ and $P_1$-$P_M$, and a plurality of sensor components SC connected to the sensing signal lines. The pixel components PX and the sensor components SC may be arranged in the form of a one-for-one rectangular matrix where there is one sensor component SC for each pixel component PX. In an alternate embodiment, there may be one sensor component SC per a predefined plurality of pixel components PX (e.g., one for every 3, every 4, every 5, etc.).

The display signal lines include a plurality of image scanning lines G1-GN transmitting image scanning signals (e.g., gate activating signals) and a plurality of image data lines D1-DM transmitting image data signals to pixel components selected by the scanning signals.

In one embodiment, the first sensing lines $S_1$-$S_N$ and the second sensing lines $P_1$-$P_M$ are connected to respective bolometer components, B in each repeated pixel unit or repeated group of pixel units where the bolometer is structured for sensing local temperature, heat or infrared radiation, and for creating a sensed signal that may be transmitted from the bolometer B to at least one of the sensing signal processors 700 and 800. More specifically, in one embodiment, the bolometer B changes its electrical resistance in response to local temperature, local heat or locally impinging infrared radiation and at least one of the sensing signal processors 700 and 800 determines the resistance of the bolometer B.

In the embodiment where there is a one-for-one correspondence between pixel components and touch sensitive components, the image scanning lines G1-GN and the first sensing lines S1-SN extend basically in a row direction to run almost parallel to each other, and the image data lines D1-DM and the second sensing lines P1-PM extend basically in a column direction to run almost parallel to each other. More specifically, in one embodiment units 400 and 700 are respectively formed along first opposed sides of the support substrate and units 500 and 800 are respectively formed along second opposed sides as indicated in FIG. 1.

Referring to FIG. 2, each pixel component PX, for example the pixel component PXij of the i-th row (i=1, 2, ..., N) and the j-th column (j=1, 2, ..., M), includes a respective switching element Qs1 connected to the corresponding image scanning line Gi and to the corresponding the image data line Dj. Each pixel component PX also includes a corresponding electro-optical converter unit E/OU that converts local electrical state into a corresponding optical state. The switching element Qs1 may be a thin film transistor having three terminal elements including a control terminal (gate) connected to the image scanning line Gi, an input terminal (source) connected to the image data line Dj, and an output terminal (drain) connected to electric-optical converter EOU (e.g., a pixel-electrode).

The electric-optical converter EOU converts an intensity of electric signal passed selectively through the switching element Qs1 into a corresponding optical state. The electric-optical converter unit EOU may be varied according to the kind of display device being used, and may include for example, a liquid crystal capacitor in the case of a liquid crystal display (LCD) being used, and an organic light emitting diode in the case of an organic light emitting device (OLED) being used. In an exemplary embodiment described here, the electric-optical converter unit EOU includes an electrophoretic capacitor for the case of the electrophoretic display (ELPD) being used. The electrophoretic capacitor may be characterized as a combination of plural small capacitors each defined by positioning of a microcapsule shaped particle. In one embodiment, the microcapsules include electrophoretic particles of two kinds having different polarities, and a transparent dielectric fluid. The dielectric fluid provides a predetermined viscosity when the electrophoretic particles are moved in response to a voltage applied across the electrophoretic capacitor, and the electrophoretic capacitor, including the viscous dielectric fluid has a function such that the moved electrophoretic particles are not moved again if the applied voltage is eliminated. Of the two electrophoretic particle kinds with the different polarities, one may have a black color and the other may have a white color. Other color combinations are of course possible. If the electrophoretic particles of the black color are arranged on the side of the upper substrate from which image light is reflected, black is displayed, and if the electrophoretic particles of the white color are arranged on the side of the upper substrate, white is displayed. Various shades of gray may be realized by varying the local density of number of black color electrophoretic particles at the top and number of white color electrophoretic particles at the top. The structure of the microcapsules will be again described with reference to FIG. 4.

As mentioned, the sensor component SC includes the bolometer B which is capable of sensing local heat and/or local infrared ray radiation. In one embodiment of the bolometer B, if a respective one of thermally conducted heat or infrared (IR) radiation is sensed, the resistance is changed accordingly, and a voltage across and/or a current carried by the bolometer B is changed according to the changed resistance such that it may be confirmed whether a predetermined conducted heat or impinged by IR radiation state of the bolometer B is present. There is a merit to this approach in that the bolometer B senses a touch by heat and/or infra-red as produced by a live finger or by another component through a simple structure, and the sensing may differentiate as to whether such detection is realized through conducted heat or infrared radiation that is generated due to a respective live and warm finger for example when the finger is touched, and when the touch is generated by an IR-emitting touch pen operating at a predetermined IR wavelength, the sensing is realized through infrared radiation that is generated from the touch pen. Also, the structure of the bolometer B may be made simple such that a reduction of the aperture ratio of a pixel unit due to inclusion of the bolometer B may be minimized even when a respective sensor component SC is respectively arranged for each pixel component PX (a 1:1 ratio).

In an alternate embodiment, the sensor component SC may be formed by using a light sensing element such as a photodiode or a light sensitive thin film transistor, or by using an element that is capable of sensing a change of pressure. If desired, more than one of such components may be simultaneously integrated in the display device.

In one embodiment of FIG. 2, the switching element, Qs1 may be made of an amorphous silicon or polysilicon thin film transistor (TFT) and the various signal lines may be made of one or more of single or multi-layer metal lines and conductively doped semiconductor regions.

Again referring to FIG. 1, the image scan unit 400 is connected to the image scanning lines G1-GN of the display panel unit 300, and sequentially applies to them an image scanning signal that over time is made of a combination of a predefined gate-on voltage ($V_{Gon}$) and a predefined gate-off voltage ($V_{Goff}$). The predefined gate on and off voltages ($V_{Gon}$, $V_{Goff}$) may be of levels different than digital logic levels used elsewhere in the circuitry.

The image data driver 500 is connected to the image data lines D1-DM of the display panel unit 300, and selects among respective gray level voltages generated by the gray voltage generator 550 for application to respective ones of the data lines in synchronism with the gate scanning signals so as to thereby addressably drive the pixel components and form a desired image.

The sensing signal processors 700 and 800 include a first sensing signal processor 700 connected to the first sensing lines S1-SN thereby sensing the detection signal from the first sensing lines, and a second sensing signal processor 800 connected to the second sensing lines $P_1$-$P_M$ thereby sensing the detection signal from the second sensing lines. In one embodiment, the sensing signal processors 700 and 800 detect a change of voltage value as it appears between matrix-addressed pairs of the sensing lines due to changed resistance in the corresponding bolometer B. The sensing signal processors 700 and 800 execute a predefined signal processing operation such as that of voltage amplifying and signal filtering, and then an analog-digital converter (A/D) converts the amplified and filtered analog voltage signal to thereby generate and output a corresponding digital sensing data signal DSN. The digital sensing data signal DSN may be input to the signal controller 600 or may be applied to another digital data processor (e.g., CPU) inside or outside of the display device 1000.

The signal controller 600 controls and coordinates the operations of the image scan unit 400, the image data driver 500, and the sensing signal processors 700 and 800.

Next, an operation of the display device will be described.

The signal controller 600 receives input image signals such as digitally encoded R, G, and B signals and an input control signal to control the display of the image signals R, G, and B from a graphics controller (not shown). The input image signals R, G, and B may contain encoded luminance information for each of the to-be-drive pixel components (PX). The encoded luminance may be one of a predetermined number of grays, such as $1024=2^{10}$, $256=2^8$ or $64=2^6$ predefined gray levels. Examples of the input control signals may include a vertical synchronization signal Vsync, a horizontal synchronizing signal Hsync, a main clock signal MCLK, a data enable signal DE, and the like.

The signal controller 600 processes the input image signals R, G, and B in such a way to be suitable for the operating conditions of the display panel unit 300 based on the input image signals R, G, and B. The signal controller 600 generates an image scan control signal CONT1, an image data control signal CONT2, and sensing control signals CONT3 and CONT4. The signal controller 600 sends the image scan control signal CONT1 to the image scan unit 400 and the image data control signal CONT2, and a processed image signal DAT to the image data driver 500. Also, the signal controller 600 sends the sensing control signals CONT3 and CONT4 to the sensing signal processors 700 and 800, respectively.

The image scan control signal CONT1 includes an image scanning start signal STV to instruct of the start of image scanning, and at least one clock signal to control an output cycle of the gate-on voltage. The image scan control signal CONT1 may further include an output enable signal OE to define a sustaining time of the gate-on voltage ($V_{Gon}$).

The image data control signal CONT2 includes a horizontal synchronization start signal STH informing of the transmission start of image data for a group of pixels PX, a load signal LOAD to instruct the data voltage to be applied to the image data lines D1-DM, and a data clock signal HCLK.

The sensing control signals CONT3 and CONT4 include a receiving control signal receiving the sensing result from each sensor component SC at the sensing signal processors 700 and 800, and signals for processing and controlling the received detection signal.

The operation of the display device may be largely divided (e.g., multiplexed over time and/or multiplexed via respective communication channels) into an operation displaying the images on the screen through the pixels PX, and an operation detecting the contact existence through the sensing units SC. The two operations may be substantially simultaneously or independently executed. In the case of the latter, the display device may only execute the display operation during a predefined display period, and may only execute the sensing operation during a predefined sensing period. In one exemplary embodiment, the two operations are substantially simultaneously executed via respective communication channels; although not necessarily having same horizontal rows of pixel units being simultaneously scanned for image display purposes and for touch sensitive sensor reading purposes.

Firstly, the display operation of displaying the images through the pixels PX will be described in detail.

The image data driver 500 receives digital image signals DAT for a row of pixels PX according to the data control signal CONT2 transmitted from the signal controller 600, and selects a gray scale voltage corresponding to each digital image signal DAT to convert the digital image signals DAT into corresponding analog data signals according to the predefined encodings of the digital signals. Thereafter, the data driver 500 applies the converted analog data signals to corresponding data lines D1 to Dm.

The image scan unit 400 applies a gate-on voltage to the image scanning lines G1-GN according to the image scan control signal CONT1 transmitted from the signal controller 600 to turn on switching devices Qs1 connected to the image scanning lines G1-GN. Then, the data voltages applied to the image data lines D1-DM are applied to one electrode (e.g., pixel-electrode) in the corresponding electro-optical converters EOU through the turned-on switching element Qs1.

The electric-optical converter EOU converts the data voltage into the optical signal, thereby displaying the desired images. In the case of the electrophoretic display, the charged electrophoretic particles are moved due to a voltage applied to one electrode, and the so moved electrophoretic particles reflect the incident light thereby displaying the images. The positions of the electrophoretic particles 31 and 33 in the microcapsule 30 are variously changed according to the magnitude of the data voltage, the polarity thereof, and the application time.

In units of one horizontal scan period per row, which may be written as "1H" and is the same as one period of the horizontal synchronization signal Hsync and the data enable signal DE, the aforementioned operations are repeatedly performed to sequentially apply the gate-on voltage to all the image scanning lines G1 to Gn on a one at a time basis, so that correspondingly synchronized data signals are applied to all the pixels PX. As a result, one frame of the image is displayed.

Next, the sensing operation of the display device will be described.

The sensing signal processors 700 and 800 apply sensor interrogation signals having predetermined levels (e.g., an electrical pulse of current having predefined magnitude) to the first and second sensing lines to confirm whether contact is being sensed by the cross-wise addressed sensor component SC. The levels of voltage signals developed as between the first sensing line and the second sensing line may be different from each other. If the contact is to be indicated by the interrogated sensor component SC, the resistance of the bolometer B of the sensor SC is changed based on the radiated infrared rays or heat conduction according to the type of touch, and as a result, the signals received from the first and second sensing lines have a different level (e.g., of voltage) corresponding to the resistance of the bolometer B and the interrogation signals (e.g., current pulses) applied from the sensing signal processors 700 and 800. As described above, the sensor SC that is touched may be confirmed through the signal having the changed level.

The first and second sensing signal processors 700 and 800 process the analog sensing data signal such as by amplifying and filtering to convert it into the digital sensing data signal DSN and output it.

The signal controller 600 or the external device determines the contact existence and the contact position by using the digital sensing data signal DSN.

Next, the structure of the pixel PX and the sensor SC of the electrophoretic display according to an exemplary embodiment of the present invention will be described with reference to FIG. 3 and FIG. 4.

Figure 3:
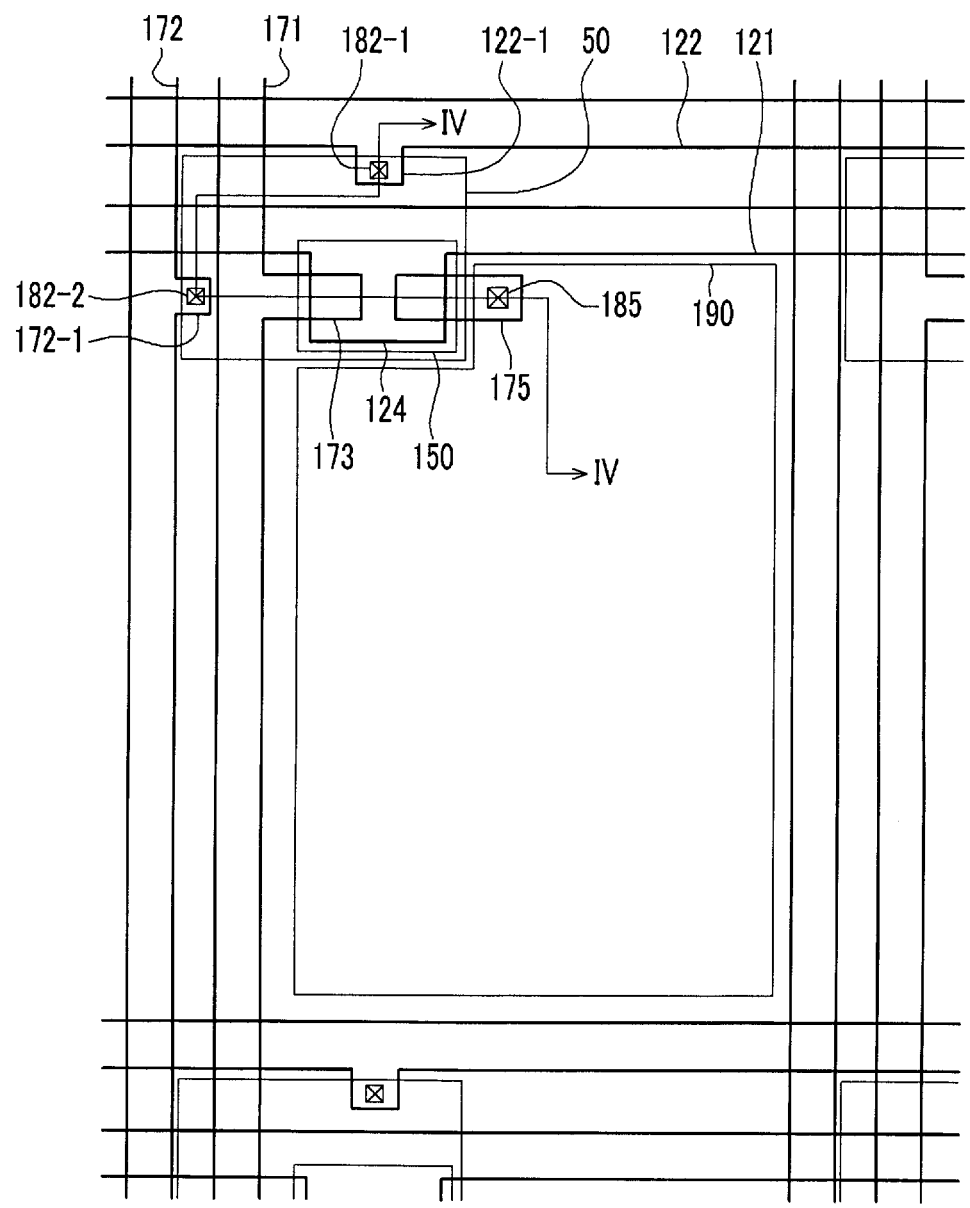
FIG. 3 is a top plan view of a pixel unit layout in an electrophoretic display according to an exemplary embodiment.
Figure 4:
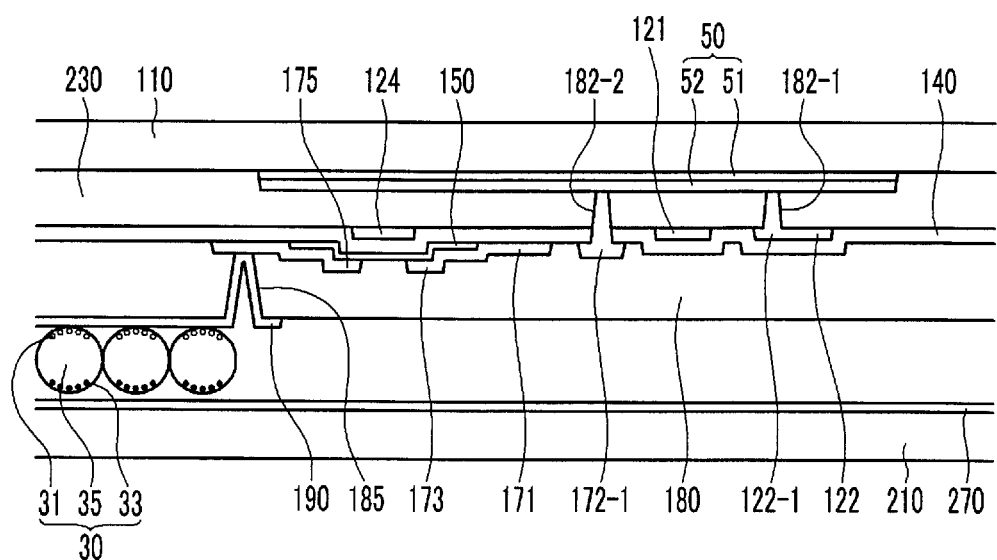
FIG. 4 is a cross-sectional view of the electrophoretic display shown in FIG. 3 taken along the line IV-IV.

FIG. 3 is a pixel layout view of an electrophoretic display according to an exemplary embodiment of the present invention, and FIG. 4 is a cross-sectional view of the electrophoretic display shown in FIG. 3 taken along the line IV-IV.

The electrophoretic display includes an upper panel, a lower panel, and an electrophoretic layer interposed between the upper panel and the lower panel.

Firstly, the lower panel will be described. As shown in FIG. 4, the lower panel includes a lower substrate 210 and a common electrode 270 formed thereon.

The lower substrate 210 may be made of a glass or a transparent plastic. The plastic is preferably flexible such that the electrophoretic display may be bent. As the plastic, polycarbon, polyimide, polyethersulfone (PES), polyarylate (PAR), polyethylenenaphthalate (PEN), and polyethyleneterephthalate (PET) may be used. When the lower substrate 210 is formed of the glass, the lower substrate 210 may have a thickness of about 500 μm, and when the lower substrate 210 is formed of the plastic, the lower substrate 210 may have a thickness of about 30 μm.

The common electrode 270 is formed on the whole display area where the plurality of pixels PX and the plurality of sensors SC are formed, and may be formed of a transparent conductor such as ITO or IZO.

Now, the upper panel will be described with reference to FIG. 3 and FIG. 4.

An upper substrate 110 is formed on the upmost layer of the upper panel.

The upper substrate 110 may be formed of a glass or of a transparent plastic like the lower substrate 210, and in the case of plastic may preferably have the flexible characteristic. When the upper substrate 110 is formed of the glass, the upper substrate 110 may have a thickness of about 500 μm, and when the upper substrate 110 is formed of the plastic, the upper substrate 110 may have a thickness of about 30 μm. The upper substrate 110 should be capable of passing therethrough one or more predefined IR wavelengths and/or locally applied heat and/or other contact indicating physical signals depending on the type(s) of contact detection to be employed in the integrated display and touch sensitive device.

A sensing layer 50 is formed under the upper substrate 110. The sensing layer 50 is formed above the position where the thin film transistor will be formed in the pixel component PX, so that the so-disposed sensing layer 50 can simultaneously provide a function of a light blocking member blocking light incident to the semiconductor layer of the thin film transistor. Also, the sensing layer 50 senses the infrared rays or the conducted heat (conducted through upper substrate 110) to change the resistance of the sensing layer 50 thereby having a function of sensing whether the contact is generated. In one embodiment, the sensing layer 50 may be made of vanadium oxide, titanium, platinum, silicon germanium (SiGe), or amorphous silicon. On the other hand, in the exemplary embodiment of FIG. 3 and FIG. 4, titanium is used for the sensing layer 50, however titanium by itself is a metal that reflects light well such that the display characteristic may be deteriorated due to light being unintentionally reflected by the titanium layer. To solve this problem, a titanium oxide layer 51 is formed on top of the titanium layer 52 to reduce the reflectance such that the deterioration of the display characteristic due to the reflection may be prevented or reduced. (It is also possible to use other material layers such as titanium nitride TiN for forming reflection interfering plates of appropriate thickness e.g., ¼ wavelength of central green color so as to reduce undesired reflections in the visible line spectrum.)

A color filter 230 underlying the sensing layer 50 but covering the pixel-electrode area is formed under the sensing layer 50. The color filter 230 may be one of three primary colors such as red, green, and blue, for each of the pixel units thereby realizing full color display of the images. The colors of the color filters 230 of the pixels PX neighboring in a horizontal direction may be different from each other, and the colors of the color filters 230 of the pixels PX neighboring in a vertical direction may be the same as each other. Also, the color filter 230 is formed to have two spaced apart contact holes 182-1 and 182-2 defined therein and exposing the overlying sensing layer 50 so that resistance sensing electrical contact may be made to the sensing layer 50 (e.g., titanium layer). The two contact holes 182-1 and 182-2 have the function of letting through contacts 172-1 and 1172-2 which respectively connect the sensing layer 50 to corresponding ones of the sensing lines.

The color filter 230 is formed within the same display panel as the pixel component PX such that the possibility that the color filter and the corresponding electrophoretic layer being misaligned may be reduced even if the display device including the flexible substrate is bent, and thereby the deterioration of the display characteristic due to the bend of the display device may be prevented.

In roughly the same area there are formed: a gate line 121 and a spaced apart first sensing line 122 where the latter is connected to the sensing layer 50 through the first contact hole 182-1 and the contact hole 182-1 is defined to extend through the electrically nonconductive color filter 230 while spaced apart signal lines 121 and 122 are adhered to the color filter 230 from its under side.

The gate line 121 and the first sensing line 122 are extended in the horizontal direction, and are parallel to each other. The gate line 121 includes an integral gate electrode 124 at the same layer where the gate electrode 124 is shown in the top plan view of FIG. 3 to be protruding downward from the gate line 121. The first sensing line 122 is similarly shown in FIG. 3 to include a contact protrusion 122-1 protruding downward. The protrusion 122-1 has the function of electrically connecting the first sensing line 122 to the sensing layer through the first contact hole 182-1. On the other hand, according to another exemplary embodiment, a separate signal line may be formed to connect the sensing layer 50 and the first sensing line 122 to each other.

A gate insulating layer 140 covering the gate line 121 and the first sensing line 122 is formed as the next layer thereunder. The gate insulating layer 140 includes an extension of the second contact hole 182-2 of the color filter 230 passing there-through. The sensing layer 50 is thus exposed through the second contact hole 182-2 passing through the gate insulating layer 140 and the color filter 230 to thereby be connected to the other sensing line.

A semiconductor layer 150 is formed under the gate insulating layer 140. The semiconductor layer 150 is disposed under the position of the gate electrode 124, and may cover the region where the gate electrode 124 is positioned. The semiconductor layer 150 may be formed of an amorphous semiconductor or a polycrystalline semiconductor (e.g., silicon) according to the exemplary embodiment, and the semiconductor layer 150 of the present exemplary embodiment is formed of the amorphous semiconductor.

Formed under the semiconductor layer 150 and the gate insulating layer 140 there are a data line 171, a drain electrode 175, and a second sensing line 172 where the latter connects to the sensing layer 50 through the second contact hole 182-2. The data line 171 and the second sensing line 172 are extended in the longitudinal direction, and are parallel to each other. The data line 171 includes a source electrode 173 extending toward the semiconductor layer 150, and the drain electrode 175 is opposite to the source electrode 173 with respect to the gate electrode 124. The gate electrode 124, the semiconductor layer 150, the source electrode 173, and the drain electrode 175 form a thin film transistor (e.g., the switching element Qs1 of FIG. 2). An ohmic contact layer made of a doped semiconductor or silicide may be further formed between the semiconductor layer 150 and the source electrode 173, and the semiconductor layer 150 and the drain electrode 175. On the other hand, the second sensing line 172 includes a protrusion 172-1 protruded toward the second contact hole 182-2, and the protrusion 172-1 has the function of electrically connecting to the sensing layer 50 through the second contact hole 182-2. In an alternate embodiment, the second sensing line 172 and the sensing layer 50 may be connected to each other through an additional signal line.

A passivation layer 180 is formed under and covering the semiconductor layer 150, the data line 171, the drain electrode 175, the second sensing line 172, and the gate insulating layer 140. The passivation layer 180 has a third contact hole 185 defined there-through and exposing a portion of the drain electrode 175.

A pixel electrode 190 is formed under the passivation layer 180, and the pixel electrode 190 is electrically connected to the drain electrode 175 through the third contact hole 185. The pixel electrode 190 may be formed of a transparent conductive material such as ITO or IZO, and receives the data voltage through the drain electrode 175 thereby applying the electric field to the electrophoretic layer.

The electrophoretic layer is formed between the upper panel and the lower panel, and the electrophoretic layer includes microcapsules 30 including the electrophoretic particles 31 and 33 of different kinds having the different charge polarities, and a transparent dielectric fluid 35. One of the kinds of electrophoretic particles 31 and 33 has the positive polarity and the other has the negative polarity, and one has the black color and the other has the white color. The electrophoretic particles 33 of the black color are formed of a black color material such as carbon black, and the electrophoretic particles 31 of the white color may be formed of titanium oxide $TiO_2$ or silica $SiO_2$. On the other hand, the electrophoretic particles 31 and 33 may be formed of a core and a colored layer enclosing the core.

The viscosity of the dielectric fluid 35 is preferably moderate to increase the mobility of the electrophoretic particles 31 and 33 when a moving field is present but hold them in position when a moving field is absent, and preferably the dielectric fluid 35 is of a type with a low dielectric constant to suppress undesired chemical reactions. The dielectric fluid 35 is made of a transparent material to obtain reflection luminance. As an example of the dielectric fluid 35, hydrocarbon such as decahydronaphthalene, 5-ethylidene-2-norbornene, fatty oil, paraffin oil, aromatic hydrocarbon such as toluene, xylene, phenylxylylethane, dodecylbenzene and alkyl naphthalene, and halogenated solvents such as perfluorodecalin, perfluorotoluene, perfluoroxylen, dichlorobenzotrifluoride, 3,4,5-trichlorobenzotrifluoride, chloropentafluoro-benzene, dichlorononane, pentachlorobenzene may be used.

The electrophoretic particles 31 and 33 are moved in different directions according to the electric field between the common electrode 270 and the pixel electrode 190, and if the white color electrophoretic particles 31 are arranged on the side of the pixel electrode 190, the light incident from the external is reflected to the electrophoretic particle 31 such that the white is recognized at the outside. Actually, the color filter 230 is formed on the pixel electrode 190 such that the correct white is not displayed even though the white electrophoretic particles 31 are arranged on the side of the pixel electrode 190, and the maximum luminance for the color of the color filter 230 is displayed. If the color filters 230 respectively represent the maximum luminance, the combination thereof displays the white.

On the other hand, if the black color electrophoretic particles 33 are arranged on the side closest to the transparent pixel electrode 190, the light incident from the external is reflected to these electrophoretic particles 33 such that the black is recognized at the outside. Also, display of various grays is possible according to the number of white color particles and black color particles that are arranged on the side of the pixel electrode 190.

The pixel electrode 190 applied with the data voltage through the thin film transistor connected to the data line 171 forms the electric field along with the common electrode 270, and the magnitude of the electric field is different according to the magnitude of the data voltage. The movement direction and the movement distance of the electrophoretic particles 31 and 33 are changed according to the magnitude of the electric field, thereby displaying the image of different grays.

Next, the structure and operation of the sensor component SC of the present embodiment will be described with reference to the perspective schematic of FIG. 5.

Figure 5:
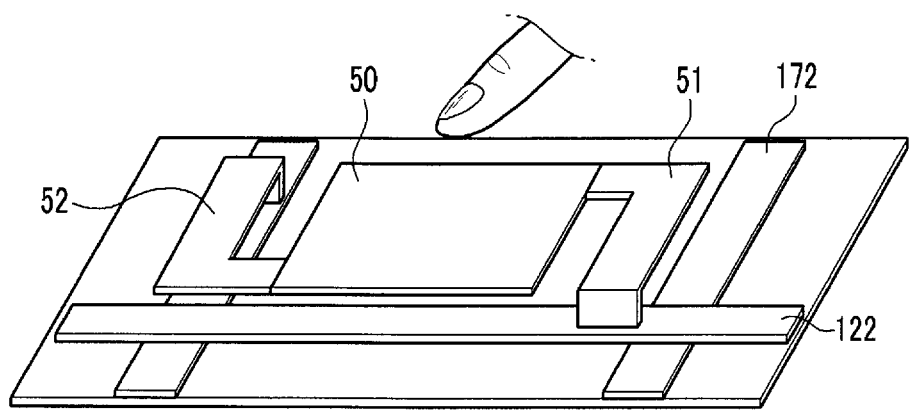
FIG. 5 is a perspective view of a sensor according to an exemplary embodiment.

The sensor SC shown in FIG. 5 is a structure of the sensor SC and the sensing lines 122 and 172 of FIG. 4, and illustration of the remaining structures related to the pixel PX is omitted.

The sensor component SC defines the bolometer B, and includes at least the sensing layer 50 and the two sensing lines 122 and 172 connected thereto.

In one embodiment, the sensing layer 50 is made of one or more materials selected from the group consisting of vanadium oxide, titanium, platinum, silicon germanium (SiGe), or amorphous silicon, and for reduction of high reflectance, as shown in FIG. 4, a reflection interfering oxide or nitride layer may be further formed thereon.

The sensing layer 50 responds to the heat or the infrared ray radiation generated when the finger approaches for the touch, and thereby the resistance of the sensing layer 50 is changed. As a result, the level of the voltage applied to the two sensing lines 122 and 172 is changed such that it may be confirmed whether the corresponding sensing layer 50 is touched.

In FIG. 5, differently from the exemplary embodiment of FIG. 3 and FIG. 4, additional connection lines 51 and 52 are formed between the sensing layer 50 and the sensing lines 122 and 172. An insulating layer such as a color filter or a gate insulating layer is formed between the sensing layer 50 and each of the sensing lines 122 and 172 such that they are electrically connected to each other through the connection lines 51 and 52.

On the other hand, the thin film transistor of the pixel PX is formed under the sensing layer 50 such that the sensing layer 50 may have a function as a light blocking member.

While the present teachings have been described in connection with what are presently considered to be practical exemplary embodiments, it is to be understood that the disclosure of invention is not limited to the disclosed embodiments, but, on the contrary, is intended to cover various modifications and equivalent arrangements included within the spirit and scope of the present teachings.

What is claimed is:

1. An electrophoretic display comprising:
a first light-passing substrate;
a sensing layer formed under the first substrate;
a sensing line electrically connected to the sensing layer;
a second substrate;
an electrophoretic layer disposed between the first substrate and the second substrate,
a color filter encapsulating at least a lower part of the sensing layer and formed under the sensing layer,
wherein
the plural sensing lines include a first sensing line and a second sensing line,
the at least one contact hole of the color filter includes a first contact hole and a second contact hole,
the first sensing line is electrically connected to the sensing layer through the first contact hole, and
the second sensing line is electrically connected to the sensing layer through the second contact hole.

2. The electrophoretic display of claim 1, wherein
the sensing layer is made of a material whose electrical resistance changes when exposed to changed levels of applied infrared (IR) rays or heat.

3. The electrophoretic display of claim 2, wherein
the sensing layer includes at least one of vanadium oxide, titanium, platinum, silicon germanium (SiGe), and amorphous silicon.

4. The electrophoretic display of claim 3, wherein
the sensing layer is made of a double layer including titanium and titanium oxide.

5. The electrophoretic display of claim 3, wherein
the sensing layer includes a reflection reducing layer disposed above the sensing layer.

6. The electrophoretic display of claim 5, wherein
the reflection reducing layer includes a metal oxide or nitride.

7. The electrophoretic display of claim 1, further comprising:
a thin film transistor positioned under the sensing layer, a gate line and a data line connected to the thin film transistor and formed under the sensing layer.

8. The electrophoretic display of claim 7, wherein
the sensing lines include a first sensing line extending parallel to the gate line and a second sensing line extending parallel to the data line.

9. The electrophoretic display of claim 7, further comprising:
a passivation layer covering the thin film transistor; and
a pixel electrode formed under the passivation layer,
wherein the passivation layer has a contact hole defined therethrough and wherein the pixel electrode is electrically connected to an output terminal of the thin film transistor by way of the contact hole in the passivation layer.

10. The electrophoretic display of claim 1, wherein
the color filter has at least one contact hole defined therethrough and exposing the sensing layer.

11. The electrophoretic display of claim 10, wherein
at least one of the sensing lines is electrically connected to the sensing layer by way of a corresponding at least one of the contact holes defined through the color filter.

12. The electrophoretic display of claim 1, wherein
the electrophoretic layer includes microcapsules each including electrophoretic particles.

13. The electrophoretic display of claim 12, wherein
the electrophoretic particles are divided into two types of electrophoretic particles having respective charges of opposed polarities.

14. The electrophoretic display of claim 13, wherein
one of the two types of electrophoretic particles includes a dark color imparting material such as carbon black, and the other includes a light color imparting material such as titanium oxide or silica.

15. The electrophoretic display of claim 1, further comprising
a common electrode formed on the second substrate.

16. An electrophoretic display comprising:
a first substrate;
a plurality of thin film transistors disposed on the first substrate;
a plurality of color filters disposed on the first substrate;
a plurality of sensor components formed between the first substrate and the plurality of thin film transistors;
a second substrate opposite the first substrate; and
a plurality of electrophoretic particles disposed between the first substrate and the second substrate.

17. The electrophoretic display of claim 16, wherein at least one of the sensor components functions as a light blocking member that blocks external light from becoming incident upon one or more thin film transistors.

18. The electrophoretic display of claim 16, wherein each sensor component overlaps one of semiconductor layers in the plurality of thin film transistors.

19. The electrophoretic display of claim 18, wherein the each sensor component does not overlap a contact hole for connecting a pixel electrode and a drain of the thin film transistor.

20. The electrophoretic display of claim 19, wherein the each sensor component does not overlap the pixel electrode.

* * * * *